(12) United States Patent
Iwamoto (10) Patent No.: US 7,057,505 B2
(45) Date of Patent: Jun. 6, 2006

(54) ALARM INFORMATION PROVIDING APPARATUS FOR VEHICLE

(75) Inventor: Taro Iwamoto, Kanagawa (JP)

(73) Assignee: Suzuki Motor Corporation, Hamamatsu (JP)

( * ) Notice: Subject to any disclaimer, the term of this patent is extended or adjusted under 35 U.S.C. 154(b) by 68 days.

(21) Appl. No.: 10/642,176

(22) Filed: Aug. 18, 2003

(65) Prior Publication Data
US 2004/0090314 A1 May 13, 2004

(30) Foreign Application Priority Data
Aug. 27, 2002 (JP) .............................. 2002-246222

(51) Int. Cl.
B60Q 1/22 (2006.01)

(52) U.S. Cl. .................. 340/463; 340/435; 340/436; 340/937; 340/903; 180/271

(58) Field of Classification Search ................ 340/937, 340/947, 903, 435, 436, 425.5; 180/167, 180/169, 271; 348/135, 148, 149, 153, 143

See application file for complete search history.

(56) References Cited

U.S. PATENT DOCUMENTS

| | | | | |
|---|---|---|---|---|
| 5,521,579 A | * | 5/1996 | Bernhard | .................... 340/438 |
| 5,598,164 A | * | 1/1997 | Reppas et al. | ................. 342/70 |
| 5,940,011 A | * | 8/1999 | Agravante et al. | .......... 340/903 |
| 6,657,581 B1 | * | 12/2003 | Lippert et al. | ................. 342/70 |

FOREIGN PATENT DOCUMENTS

| | | |
|---|---|---|
| DE | 3028077 | 6/1987 |
| DE | 19818259 | 11/1998 |
| DE | 19835601 | 2/2000 |
| DE | 19851434 | 5/2000 |
| DE | 19801205 | 7/2001 |
| DE | 10012737 | 9/2001 |
| DE | 100 42 375 A1 * | 5/2002 |
| DE | 10042375 | 5/2002 |
| JP | 2641562 | 8/1997 |
| JP | 9220975 | 8/1997 |
| JP | 2906101 | 6/1999 |
| WO | 01/ 250854 | 4/2001 |

OTHER PUBLICATIONS

English Language Translation of JP Appln. No. 2641562.
English Language Translation of JP Appln. No. 2906101.
English Language Translation of JP Appln. No. 9-220975.

* cited by examiner

Primary Examiner—Daniel Wu
Assistant Examiner—Travis Hunnings
(74) Attorney, Agent, or Firm—Greenblum & Bernstein, P.L.C.

(57) ABSTRACT

An alarm information providing apparatus for a vehicle includes a recognizer that recognizes surrounding circumstances of the vehicle in a plurality of directions, a provider that provides alarm information to a driver according to surrounding information output from the recognizer that recognizes surrounding circumstances, and a receiver that receives an alarm information request so as to control the provider using an instruction from the driver as a trigger and comprises a sensor configured to transmit information specifying a direction to an alarm information output controller without activating a turn signal.

8 Claims, 11 Drawing Sheets

| information to be provided | conditions | operation of oscillating means |
|---|---|---|
| alarm level 0 | relation of relative speed and relative distance is within "range 0" | none |
| alarm level 1 | relation of relative speed and relative distance is within "range 1" | oscillation pattern 1 (30-60 Hz) |
| alarm level 2 | relation of relative speed and relative distance is within "range 2" | oscillation pattern 2 (30-60 Hz) |
| alarm level 3 | relation of relative speed and relative distance is within "range 3" | oscillation pattern 3 (80-150 Hz) |
| alarm level 4 | relation of relative speed and relative distance is within "range 3", and driver H turned lever | oscillation pattern 3 (80-150 Hz) |

ALARM INFORMATION PROVIDING APPARATUS FOR VEHICLE

BACKGROUND OF THE INVENTION

1. Field of the Invention

The present invention relates to an alarm information providing apparatus for a vehicle, and in particular, to an apparatus which provides alarm information to a driver of a vehicle upon request from the driver.

2. Description of the Related Art

When changing traffic lanes or driving courses, drivers of vehicles such as automobiles confirm the circumstances behind the vehicles through back mirrors and side mirrors or with their eyes. Unfortunately, there is a case that the backside circumstances are not accurately recognized because of a driver's carelessness. In this case, if the driver changes the course without confirming the backside circumstances, the vehicle may abnormally approach another approximate vehicle driving behind it. In order to avoid such a case, apparatuses for providing surrounding information of a driving vehicle to the driver has been conventionally developed.

Figure 11:
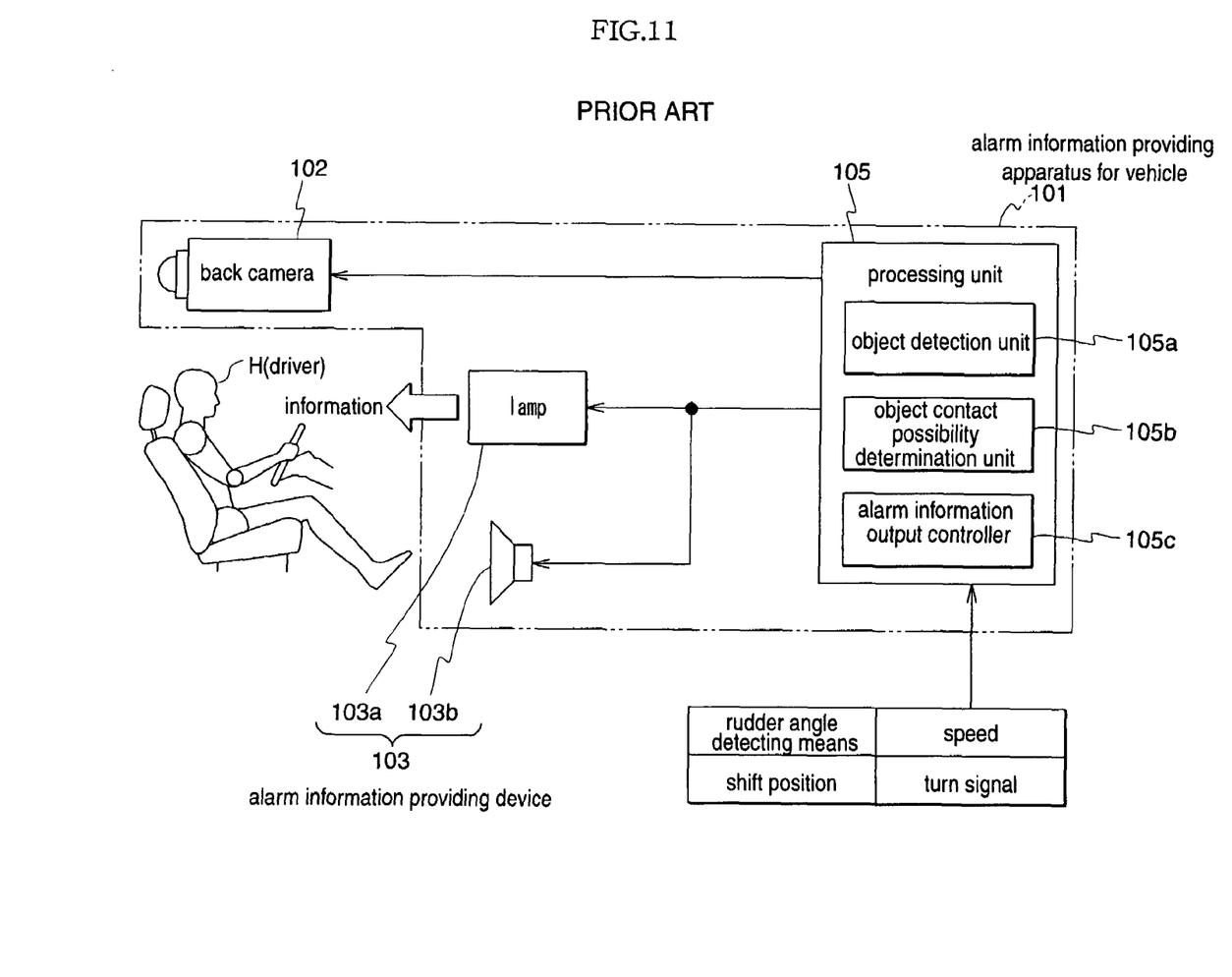
FIG. 11 is a block diagram showing the structure of a conventional alarm information providing apparatus for a vehicle.

Those apparatuses include a means for detecting information related to the surrounding circumstances, for example, presence of other vehicles driving behind or distance between the own vehicle and the other vehicles. The apparatuses have a function of providing alarm information to the driver by using information recognized by hearing such as buzzers and voices, or information recognized by visual such as lamp flashing or images. A specific example will be explained with reference to FIG. 11. FIG. 11 is a function block diagram showing a conventional alarm information providing apparatus for a vehicle 101.

The alarm information providing apparatus for a vehicle 101 shown in FIG. 11 includes, a means for recognizing surrounding circumstances of a vehicle, and a means for providing alarm information to the driver of the vehicle according to the surrounding information provided by the means for recognizing surrounding circumstances. The means for recognizing surrounding circumstances consists of a back camera 102 for taking in the circumstances behind the vehicle as image data, and an object detecting unit 105a and an object contact possibility determining unit 105b which are incorporated in a processing unit (controller) 105 for processing the image data taken by the back camera. The object detecting unit 105a detects another vehicle driving behind, and the object contact possibility determining unit 105b performs determination of the contact possibility between the own vehicle and the other vehicle. Once the object contact possibility determining unit 105b determines that the own vehicle has a possibility to contact the other vehicle driving behind, and the own vehicle needs to take precautions against it, an alarm information providing unit 103 such as a lamp 103a or a buzzer 103b is output-controlled by an alarm information output controller 105c in the processing unit 105. Consequently, information for urging precautions is provided to the driver H (alarm information providing unit). Note that the means for recognizing surrounding circumstances will be explained in detail in embodiments of the present invention described later.

As the aforementioned means for providing alarm information, the Japanese Patent No. 2906101 discloses a means in which a device for oscillating the acceleration pedal is added for an alarming purpose. Further, the Japanese Patent Laid-open No. 9-220975 discloses a device for oscillating the steering wheel, the breaking pedal or the acceleration pedal for an alarming purpose as well. These devices have not been used generally from the point of practicability.

Moreover, the Japanese Patent No. 2641562 discloses a device which recognizes, when the blinker lever is operated in either direction, the backside vehicle circumstances of the corresponding direction and informs alarm information.

However, there may be a case that information, related to circumstances where a danger may happen by changing the course or turning right/left, is provided to the driver when it is not necessary for the driver. In such a case, a lamp or a buzzer as the alarm information may cause discomfort to the driver or passengers. Particularly, when an alarming direction is irrelevant to the driving direction of the vehicle, the driver does not need to confirm it, so that the alarm information itself is worthless.

Further, considering a course change with an automobile, for example, the period from the time when the driver decides to change the course to the time the driver actually performs the change is generally short. Therefore, if the information is presented to the driver by a conventional visually indicating means or the like, there may be a case that the driver cannot adequately respond to the information by sufficiently recognizing the information. That is to say, since the period from flashing the blinker to actually changing the course is extremely short, it may be difficult to take an appropriate measure corresponding to the alarm information if the alarm information is presented after the blinker is flashed.

If countermeasures are taken by, for example, speeding up the presenting timing of the information in order to avoid the aforementioned problems, there may be cases that the information quality degrades or the driver is annoyed by the visual or audio information. As a result, new problems, such as an increase in a burden of the driver to recognize information and a divergence between the information contents and the driver's recognition, arise.

SUMMARY OF THE INVENTION

An object of the present invention is to provide an alarm information providing apparatus for a vehicle, which improves the aforementioned inconveniences of the conventional devices, and by which alarm information is provided when necessary, a driver can easily obtain alarm information upon request, and discomfort of the driver and passengers is suppressed.

In order to achieve the aforementioned object, an alarm information providing apparatus for a vehicle according to the present invention comprises, a means for recognizing surrounding circumstances of the vehicle in a plurality of directions, a means for providing alarm information to a driver corresponding to surrounding information output from the means for recognizing surrounding circumstances, and a means for receiving an alarm information request so as to control the means for providing alarm information using an instruction from the driver as a trigger. The means for receiving an alarm information request includes functions of specifying a direction of the surrounding information to be output according to the instruction from the driver, and outputting information of an identified direction as the trigger to the means for providing alarm information. The means for providing alarm information includes a function of providing alarm information by switching it according to the information of the direction output from the means for receiving an alarm information request.

In the present invention, the means for recognizing surrounding circumstances obtains the information by recognizing the surrounding circumstances of the vehicle in a plurality of directions. When the driver of the vehicle wants to obtain information for the surrounding circumstances of the vehicle, for example, backside information for performing a course change, the driver inputs an intention of obtaining the information as a trigger into the means for receiving an alarm information request. Then, the means for receiving an alarm information request controls the means for providing alarm information using the instruction from the driver as a trigger. Specifically, the means for receiving an alarm information request specifies a direction of the surrounding information to be output according to the instruction input form the driver as a trigger, and output the information of the specified direction as a trigger.

The means for providing alarm information, upon receipt of the trigger from the means for receiving an alarm information request, switches the surrounding information to be provided according to the instruction of the driver based on the information of the direction output from the means for receiving an alarm information request, then provide the switched surrounding information to the driver.

Accordingly, the driver can obtain necessary surrounding circumstances that the driver intends, when necessary, so that accidents or the like with the following vehicle can be avoided by accurately deciding the surrounding circumstance based on the provided surrounding information.

Further, the surrounding information necessary for driving is provided when the driver requests. Therefore, it can reduce annoyance to the driver or the passengers, different from a case that alarm information is always provided in the vehicle.

Further, the present invention may be configured to include a means for indicating a lane change, which informs the lane change to a following vehicle driving behind, and the means for providing alarm information operates with an enough time for an effective corresponding period by a time that the means for indicating a lane change operates. In this case, it is preferable that the effective corresponding period be set prior to the operation of the means for indicating a lane change.

Therefore, according to the present invention, the driver can obtain the surrounding information before indicating, through the means for indicating a lane change, a lane change to the following vehicle, determine whether it is possible to change the lane or not beforehand, and inform the following vehicle of the lane change only when it is possible to change the lane. This can prevent causing trouble to the driver of the following vehicle by the lane change and realize smooth driving.

Further, the present invention may be configured in such a manner that the means for receiving an alarm information request comprises a touch sensing means which operates by a touch of the driver, and the touch sensing means specifies the direction of the surrounding information according to a touch position where the driver touches. Further, the means for receiving an alarm information request may be configured with a switching structure which operates by a pressure applied by the driver, and the means for receiving an alarm information request having the switching structure may specify the direction of the surrounding information by identifying a direction of the pressure applied by the driver.

By using the touch sensing means as the means for receiving an alarm information request, it is possible to switch surrounding circumstances to be provided, without placing any burden to the driver, so that the driver can keep concentrating on driving. Moreover, by using the means with the switching structure as the means for receiving an alarm information request, the driver can have a feel of operation to thereby recognize that he sends an instruction for switching surrounding information to be provided.

Further, in the present invention, the means for providing alarm information may have a function of providing alarm information to the driver through oscillation via a component material of the means for receiving an alarm information request.

With this configuration, there is no need to provide alarm information in the form of information recognized by visual or audio such as a lamp or a buzzer. Therefore, it is possible to reduce an influence on driving, for example, transfer of the view point by looking at the lamp, or annoyance caused by a buzzer.

Further, the present invention may be so configured that the means for indicating a lane change comprises a lever for operating a direction indicator, and the means for receiving an alarm information request is provided to the lever for operating the direction indicator.

Surrounding information of the vehicle is needed corresponding to operations of the lever for operating the direction indicator. Since the means for receiving an alarm information request is provided to the lever for operating the direction indicator in the present invention, it is possible to perform an indication of a lane change and a request for surrounding information of the vehicle, concentrating on one place. This enables the driver to perform smooth operation.

Further, in the present invention, the means for receiving an alarm information request may be provided independently of the lever for operating the direction indicator.

Some drivers feel that it is convenient to have a structure in which a tool for indicating a direction and a tool for switching surrounding information of the vehicle are provided separately. For example, some may desire an atmosphere like a cockpit of an aircraft. Even in this case, the present invention can accommodate the desire since the means for receiving an alarm information request can be provided independently of the lever for operating the direction indicator.

BRIEF DESCRIPTION OF THE DRAWINGS

FIGS. 2(a) and 2(b) are block diagrams showing the structure of the first embodiment of the present invention, in which

FIGS. 4(a) and 4(b) explain the means for recognizing surrounding circumstances disclosed in FIG. 1, in which

FIGS. 7(a) to 7(c) are diagrams for explaining an example of alarm information provided by the means for providing alarm information, in which

PREFERRED EMBODIMENTS OF THE PRESENT INVENTION

First Embodiment

Figure 1:
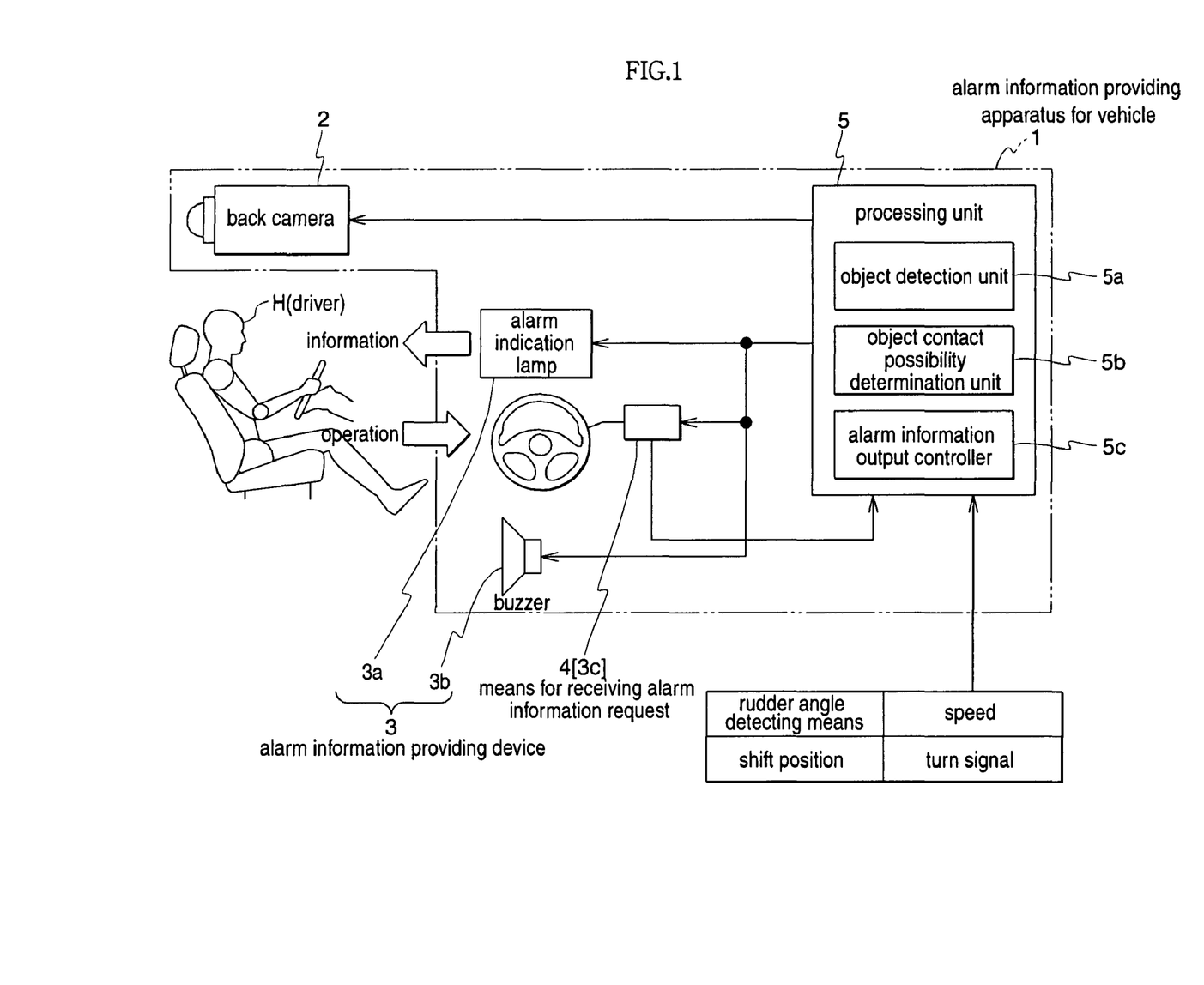
FIG. 1 is a block diagram showing the structure of a first embodiment of the present invention.
Figure 2:
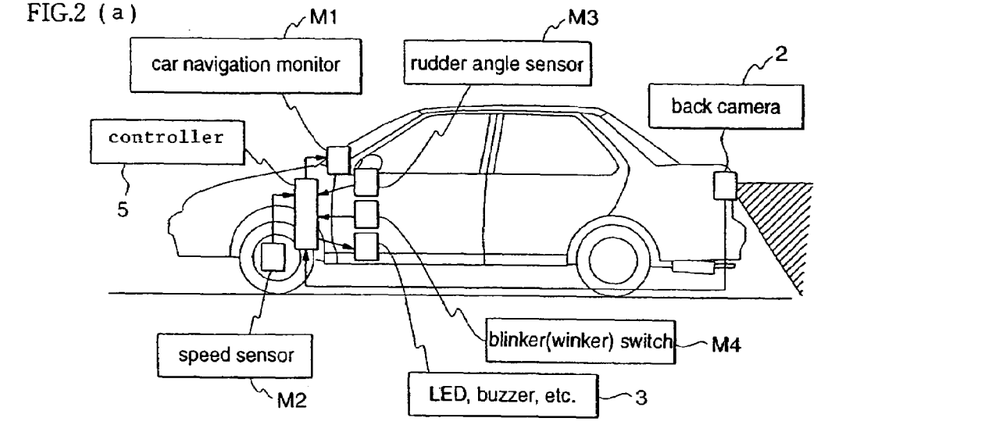
FIG. 2(a) shows an arrangement of each means with reference to the vehicle.
FIG. 2(b) shows a connection of each means.
Figure 3:
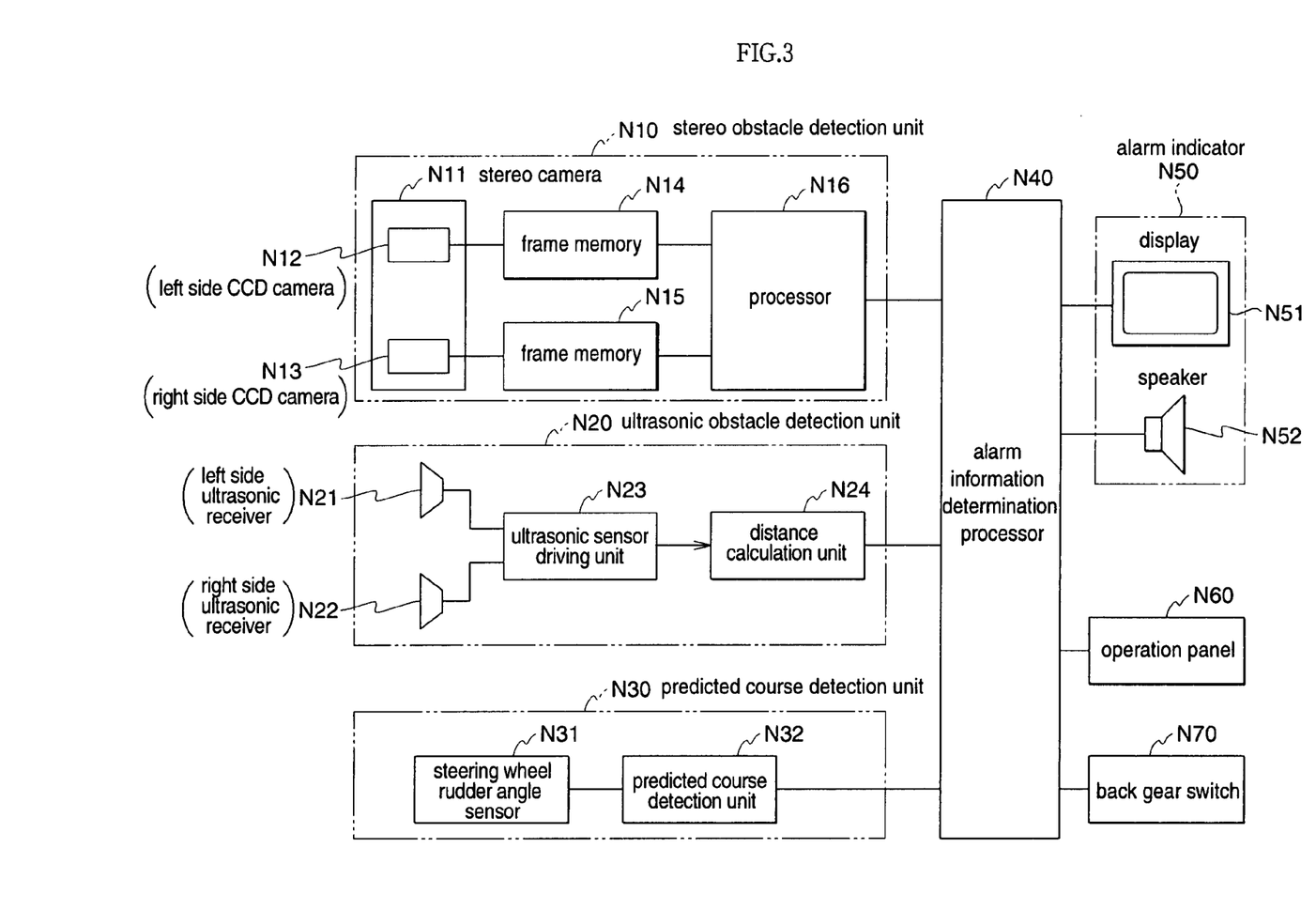
FIG. 3 is a block diagram showing an example of the means for recognizing surrounding circumstances in FIG. 1.
Figure 4A:
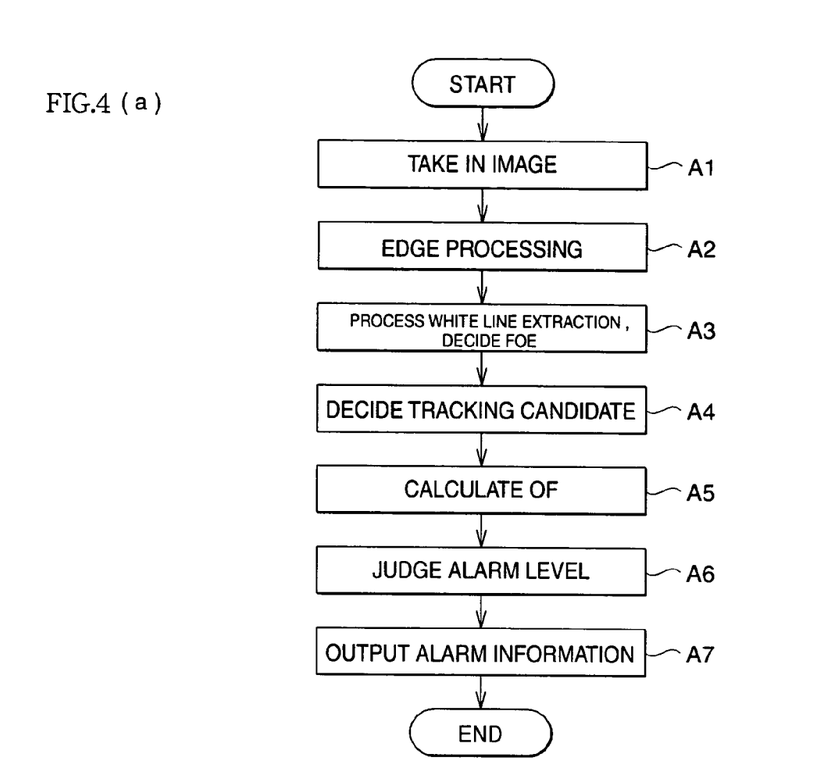
FIG. 4(a) is a flowchart showing the operation of the means for recognizing surrounding circumstances.
Figure 4B:
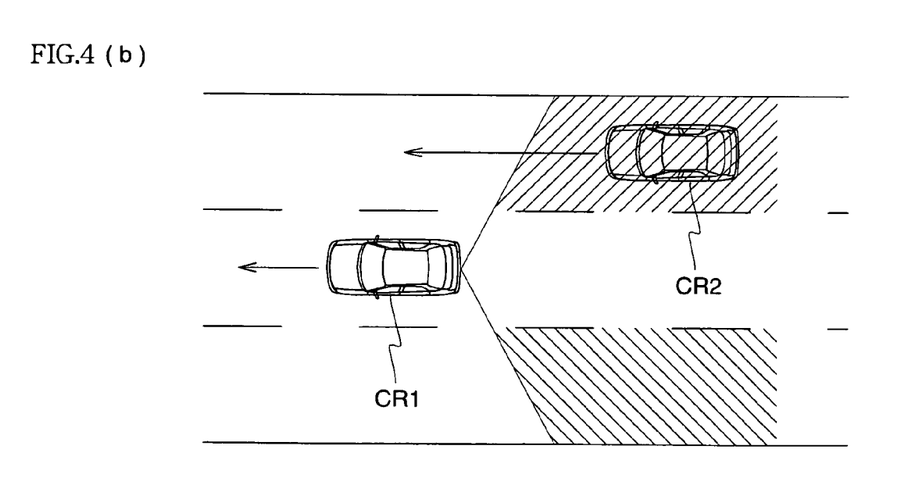
FIG. 4(b) is an explanatory illustration showing a range of recognizing the circumstances.
Figure 5:
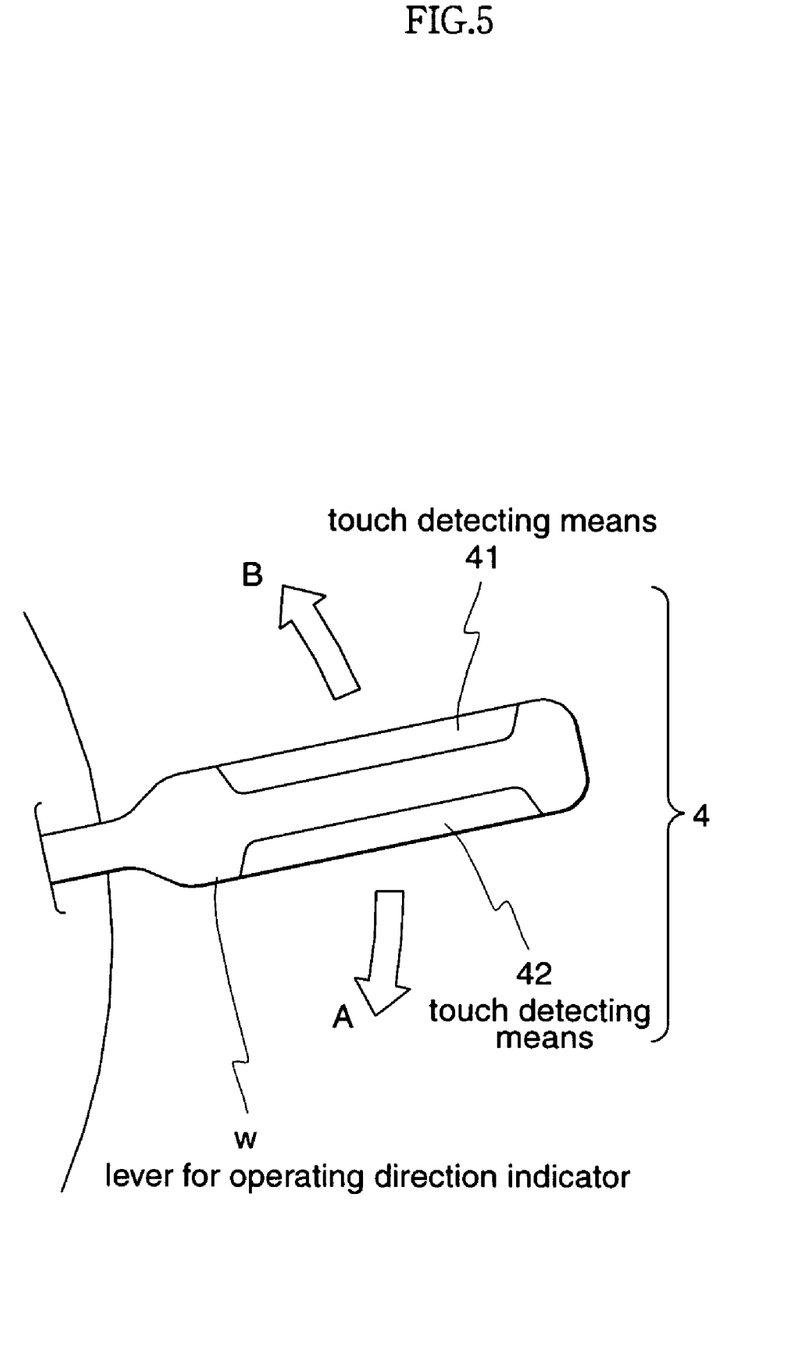
FIG. 5 is a diagram showing an example of the means for requesting alarm information disclosed in FIG. 1.
Figure 6:
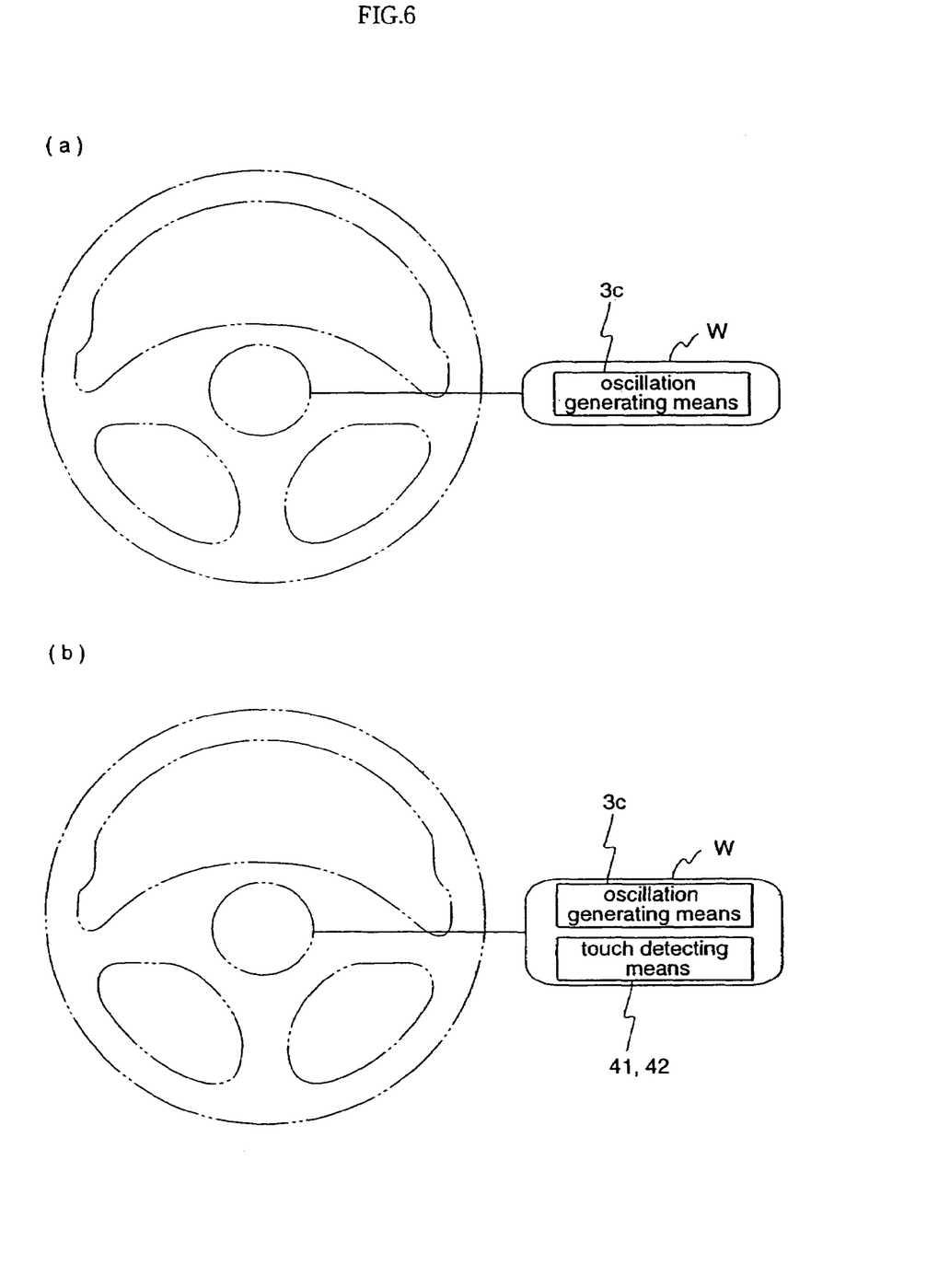
FIG. 6(a) is a diagram showing a lever for operating a direction indicator, into which the means for providing alarm information is incorporated.
FIG. 6(b) is a diagram showing a lever for operating a direction indicator, into which the means for requesting alarm information and the means for providing alarm information are incorporated.
Figure 7A:
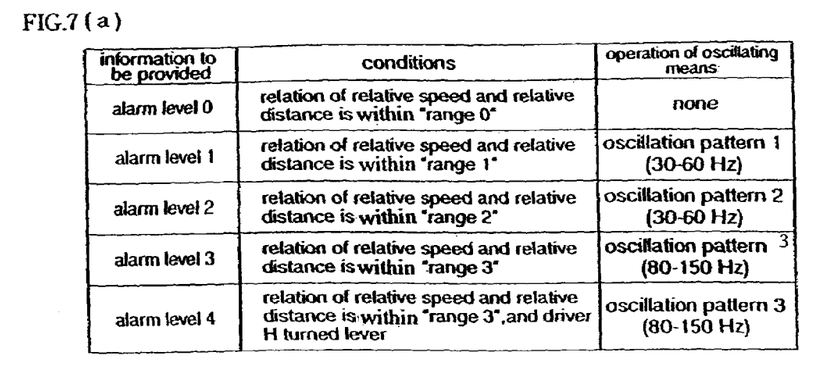
FIG. 7(a) is a correlation table showing alarm levels corresponding to relative speed and relative distance between vehicles and the corresponding oscillating conditions.
Figure 7B:
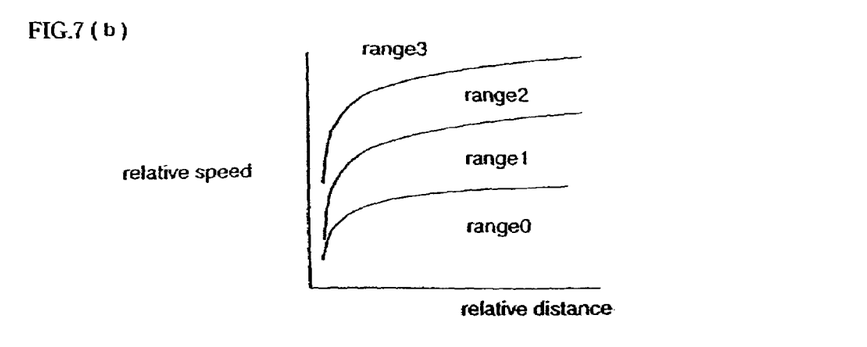
FIG. 7(b) is a graph showing reference data for determining an alarm level based on the relative speed and relative distance.
Figure 7C:
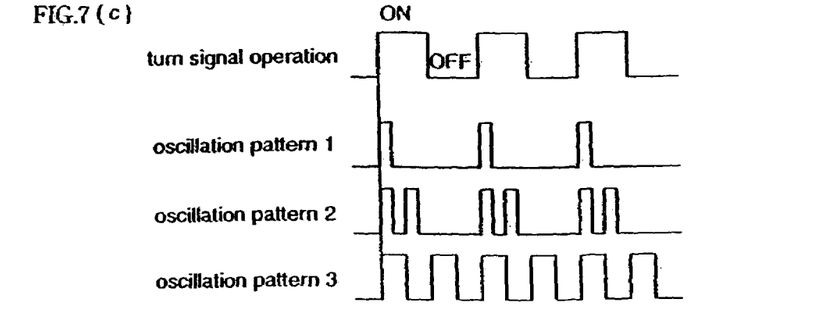
FIG. 7(c) is a diagram explaining examples of oscillating patterns.
Figure 8:
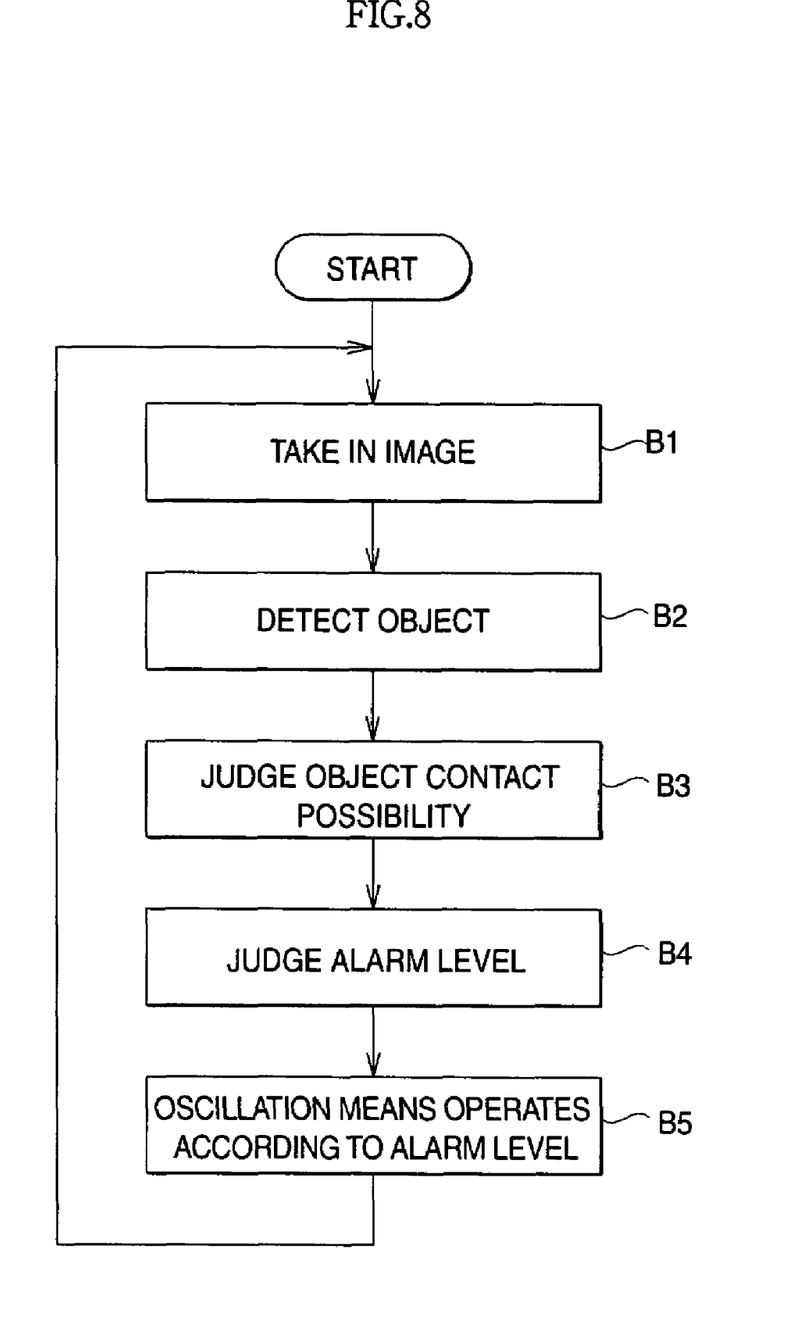
FIG. 8 is a flowchart showing the operation of the first embodiment.
Figure 9:
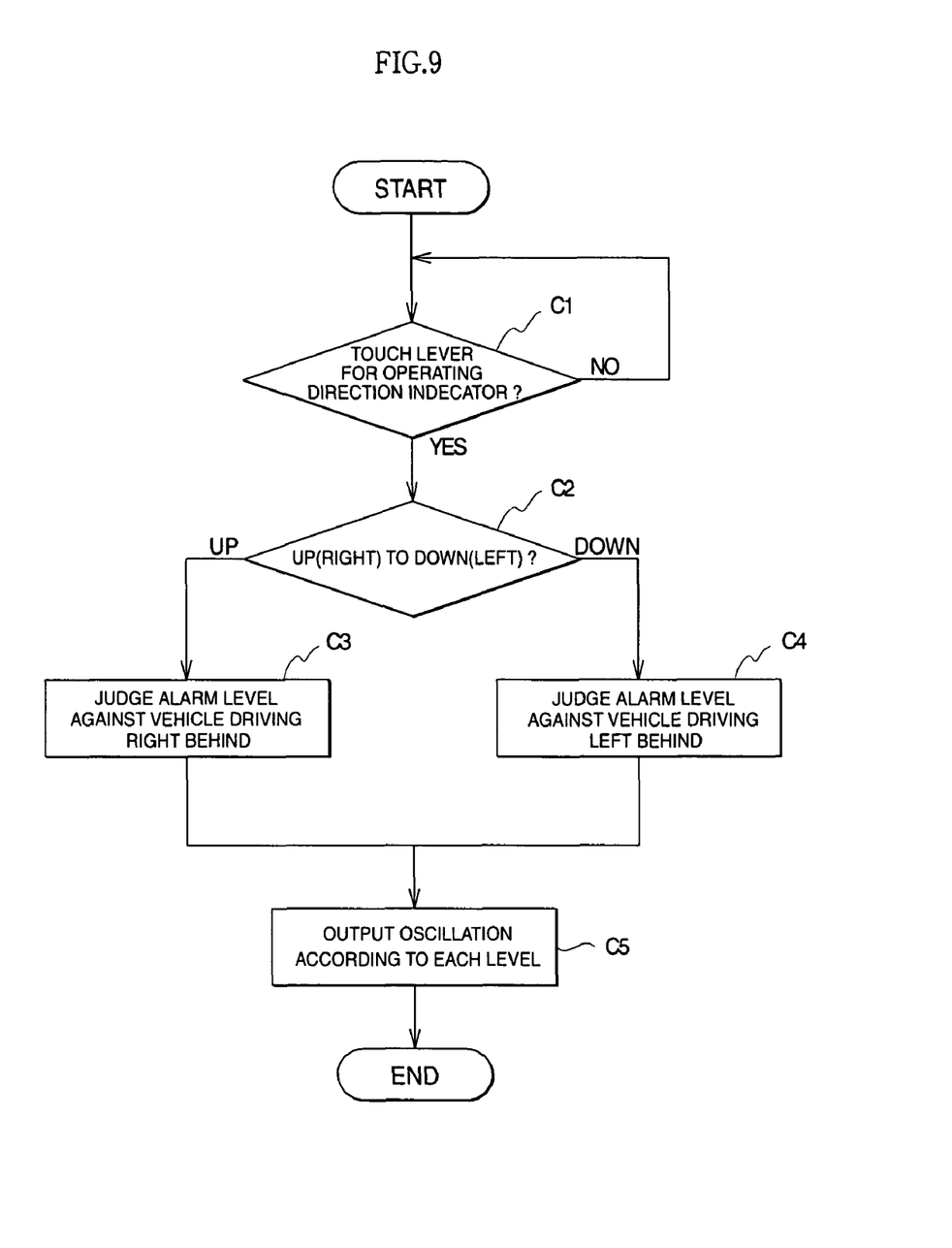
FIG. 9 is a flowchart explaining in detail a part of the operation disclosed in FIG. 8.
Figure 10:
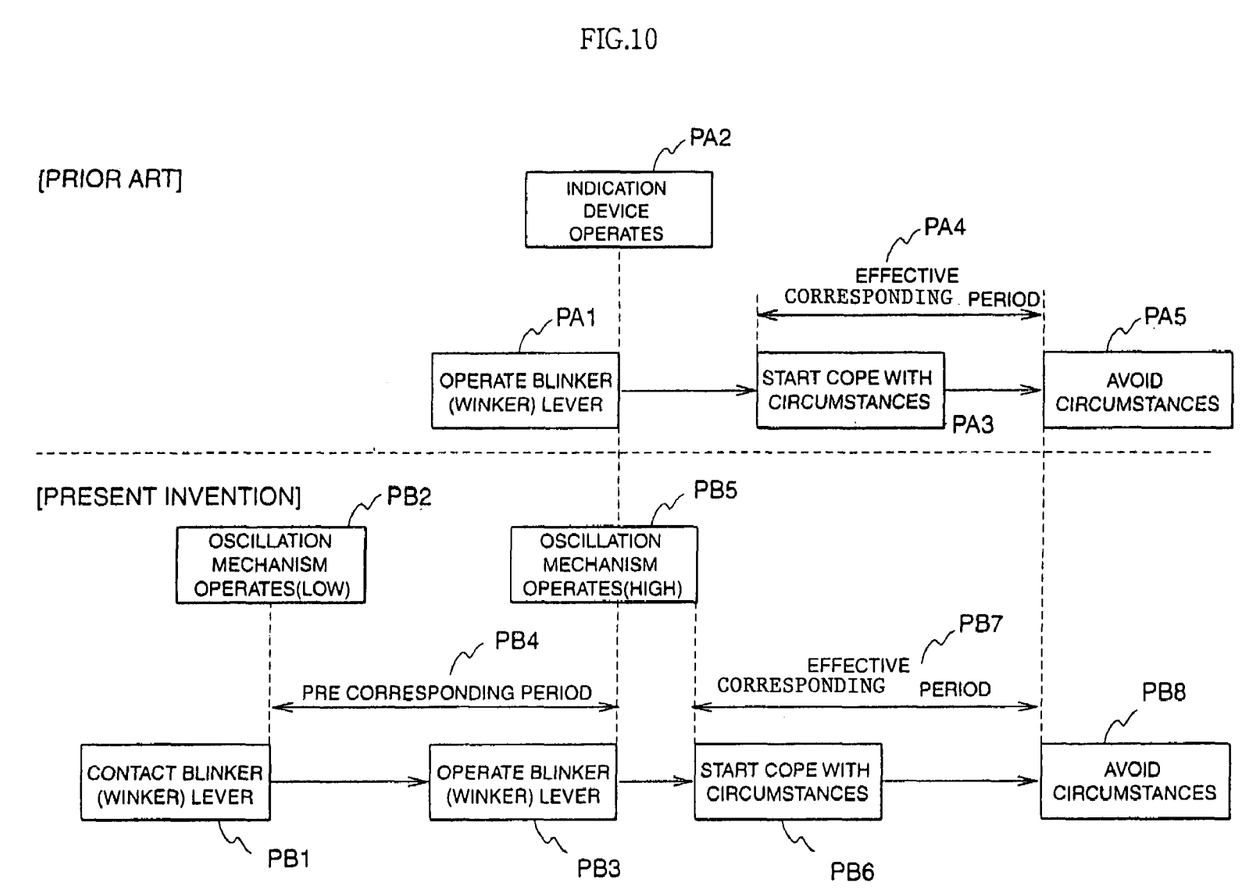
FIG. 10 is an explanatory diagram showing a comparison between the operation of the first embodiment and the operation of a conventional example.

A first embodiment of the present invention will be explained below with reference to FIGS. 1 to 10. FIGS. 1, 2(a) and 2(b) are block diagrams showing the structure of the first embodiment. FIG. 3 is a block diagram showing an example of a means for recognizing surrounding circumstances. FIGS. 4(a) and (b) explain the means for recognizing surrounding circumstances. FIGS. 5, 6(a) and 6(b) are diagrams showing a means for requesting alarm information or a means for providing alarm information. FIGS. 7(a) to 7(c) explain an example of alarm information provided by the means for providing alarm information. FIGS. 8 to 10 show the operation of the first embodiment.

(Structure)

Referring to FIG. 1, an alarm information providing apparatus 1 for a vehicle comprises: a means for recognizing surrounding circumstances of the vehicle (i.e., a back camera 2, and an object detection unit 5a and an object contact possibility determining unit 5b incorporated in a processing unit 5); a means for providing alarm information to the driver of the vehicle responding to the surrounding information provided by the means for providing surrounding circumstances (i.e., an alarm information providing device 3, and an alarm information output controller 5c incorporated in the processing unit 5); and a means for receiving an alarm information request 4 to sense a request for alarm information which is output by an operation of the driver H. With this structure, when the driver H requests alarm information, the processing unit 5 detects vehicles driving behind (the object detection unit 5a) and determines the contact possibility of the vehicle (the object contact possibility determining unit 5b). As a consequence, alarm information corresponding to the surrounding circumstances of the vehicle is provided to the driver H. This structure will be explained in detail below. Although vehicles may be automobiles, motorcycles or other mobile bodies, a case of automobile will be explained below as an example.

(Means for Recognizing Surrounding Circumstances)

The means for recognizing surrounding circumstances includes, for example, a back camera 2 for taking into the circumstances behind the vehicle as image data, and an object detection unit 5a and an object contact possibility determining unit 5b which are incorporated in a processing unit (controller) 5 for processing the taken image data. When the units 5a and 5b of the processing unit 5 determine it is necessary to take precautions against vehicles driving behind, information indicating the need of precautions is informed to the driver H through an alarm information providing device 3 such as LED 3a, a buzzer 3b, or an oscillation generating means 3c described later. Note that these devices are provided in the vehicle (automobile) as shown in FIG. 2(a). In addition to the aforementioned structure, the vehicle is also provided with: a car navigation monitor M1 for providing guide information at the time of parking to the driver based on a result of image information, which is sent from the back camera 2 and processed in the controller 5; a speed sensor M2 for detecting various signals used as determining materials when outputting the alarm information, and informing then to the controller 5, a rudder angle sensor M3, a blinker switch M4, and the like.

An example of an electrical connection between these devices is shown in the block diagram of FIG. 2(b). As shown in the figure, NTSC video signals SL1 taken by the back camera 2 are transmitted to an image processor BL5 via an image interface (I/F) unit BL1, and are processed at the image processor BL5 as described later. The video signals of the backside information taken by the back camera 2 are also transmitted directly to a monitor provided in the vehicle (see numeral SL2). Here, the image processor BL5 processes the image with a control by a micon unit BL6, which is also the processing unit 5, and exchanges the processed signals. The micon unit BL6 performs, via an I/O interface (I/F) unit BL2, inputting from and outputting to other devices each signal shown as reference numeral SL3. Further, the micon unit BL6 performs, system debug (see numeral SL4) via RS-232C interface (I/F) unit BL3, and controlling an in-vehicle CAN (Controller Area Network) (see numeral SL5) via a CAN interface (I/F) unit BL4. At this time, a voltage of 12V (power resource) shown as numeral SL6 is transmitted to the micon unit BL6 and the image processor BL5 via a power source unit BL7.

The surrounding circumstances recognizing means may be configured as shown in FIG. 3. That is, in addition to a device (a stereo obstacle detection unit N10) equivalent to the detection means for detecting backside vehicle by a camera as described above, an ultrasonic obstacle detection unit N20 may be used together. The ultrasonic obstacle detection unit N20 takes in an ultrasonic wave reflected at an obstacle (backside vehicle) by two ultrasonic receiving means N21, N22, transmits it to a distance calculation unit N24 through an ultrasonic sensor driving unit N23, and calculates at the distance calculation unit N24 a distance between the vehicle and the obstacle. Based on information related to the distance to the obstacle, and driving course information of the vehicle detected at a predicted course detection unit N30 consisting of a handle rudder angle sensor N31 and a predicted course calculation unit N32, it is determined whether alarm information should be provided or not, at an alarm information determination processor N40 which is equivalent to the object contact possibility determining unit 5b and the alarm information output controller 5c. If alarm information is determined to be necessary, alarm information is output via an alarm indicator N50 (that is, a display N51 or a speaker N52). Note that the alarm information determination processor N40 may detect operating conditions of a back gear switch N70, and according to the result, output alarm information. Further, an operating panel N60 for setting the criteria for the alarm information determination processor N40 is also provided. In FIG. 3, the means for detecting backside vehicle (the stereo obstacle detection unit N10) is a stereo camera. More specifically, image data from a stereo camera N11 formed of right and left CCD cameras N12, N13 is taken into each frame memory N14, N15, and a distance from the vehicle to the obstacle (backside vehicle) is calculated at a processor N16 with a stereo parallax. Then, the distance information is transmitted to the alarm information determination processor N40, which determines whether alarm information is necessary or not, taking into account the predicted course information of the vehicle.

Next, an operational example of the means for recognizing surrounding circumstances (2, 5a, 5b) will be explained with reference to the FIGS. 4(a) and 4(b). In FIG. 4(b), the alarm information providing apparatus 1 for a vehicle of the present invention is mounted in a vehicle CR1 driving the center lane. First, the back camera takes in the backside images (Step A1). Here, a range of image to be taken, that is, a range where circumstances are to be recognized, are diagonal parts shown in FIG. 4(b), so that the image within the range is taken. The reason for recognizing the diagonal parts in FIG. 4(b), which means, for recognizing right and left circumstances of the backside is to take precautions so as not to be abnormally approached by the backside vehicle CR2 when the vehicle CR1 changes the lane. However, the recognition range is not limited to these ranges.

Subsequently, the means performs an edge processing to the taken image (Step A2), and decides an infinite-point (FOE) of the motion while extracting white lines on the road surface (Step A3). Next, the means decides a tracking candidate within the detection range (Step A4), and detects an optical flow (Step A5), to thereby recognize the approaching vehicle (the object detection unit 5a). Here, the processing unit 5 detects a rudder angle by the rudder angle detecting means of the own vehicle and also detects the speed, the shifting position, the perspective driving direction of the vehicle (detected through operating conditions of the lever for operating the direction indicator), and the like. Considering the above, the processing unit 5 determines whether there is a possibility that the backside vehicle contacts the own vehicle, that is, whether it is necessary to take precautions or not Step A5/Step A6, the object contact possibility determining unit 5b). When it is determined that precautions are necessary, a means for providing alarm information (alarm information providing device 3, alarm information output controller 5c) described later provides alarm information to the driver (Step A7).

In the structure shown in FIG. 3, by performing detection by the ultrasonic obstacle detecting unit together, an object, which is not detected by the stereo obstacle detecting unit, that is, the detecting means using a camera, can be detected in the approximate (within 2 m of the backside) of the vehicle, which is in the monitoring range. Therefore, object detection is accurately performed.

The aforementioned means for recognizing surrounding circumstances 2 can be realized using a technique, for example, disclosed in "A sensor technique of a system for supporting improvements in backside visual range and visibility", "Automobile Technology Vol.56, No. 4 2002" p. 53, which means it is realized by a well-known technique. Therefore, further detailed explanation is omitted.

(Means for Receiving an Alarm Information Request)

Next, a means for receiving an alarm information request will be explained with reference to FIG. 5. FIG. 5 is a perspective view showing an example of the means for receiving an alarm information request 4. The means for receiving alarm information request 4 shown in the FIG. 5 is formed in a lever W for operating the direction indicator (blinker lever), which is provided to a supporting shaft of the handle of an automobile. However, the means for receiving an alarm information request 4 may be formed in other devices than the lever W for operating the direction indicator , such as a predetermined position of an instrument panel or the rear side of a steering. Note that a direction indicating signal output by operating the lever W for operating the direction indicator is also called as a blinker, a turn signal, or a direction indicating lamp.

The means for receiving an alarm information request 4 is, as aforementioned, also a means for sensing a request for alarm information output by the operation of the driver H. In the present invention, an operation by the driver H to request alarm information is performed by an operation other than an operation for changing the motion of the vehicle. Therefore, the means for receiving an alarm information request 4 senses an operation by the driver H without the lever for operating the direction indicator being moved, or the direction indicating lamp being flashed in either of the right and the left direction. More specifically, the means for receiving an alarm information request 4 is formed of a touch sensing means 41, 42, and receives a touch by the driver as a request for alarm information. It should be noted that operations for requesting alarm information by the driver H is not limited to the aforementioned. Rather, it may be an operation to change the motion of the vehicle.

The touch sensing means 41, 42 is formed in the outer periphery of the lever W for operating the direction indicator having a bar shape, by divided into two parts. Specifically, the divided two parts are formed separately in the upper part and the lower part as shown in FIG. 5. When touched by a human body, it senses the touch. As for the touch sensing means 41,42, a generally used touch sensor is used.

When the driver H touches the touch sensing means 41 on the upper side of the lever W for operating the direction indicator, it is predictable that the driver H moves the lever to a downward direction (a direction shown by an arrow A). This is a pre-operation to flash the direction indicating lamp on the right side, so that it is predictable that the course of the vehicle is changed to the right. Therefore, since this is predicted to be the pre-stage of turning to the right or changing the lane to the right lane, it is assumed that information for the surrounding circumstances of the right backside is requested. In contrast, when the driver touches the touch sensing means 42 on the lower part of the lever W, it is predictable that the driver H moves the lever W to an upward direction (direction shown by an arrow B). Therefore, since it is predicted to be the pre-operation for turning to the left or changing the lane to the left lane, it is assumed that information for the surrounding circumstances of the left backside is requested.

When a touch by the driver H is sensed, information of which is transmitted to an alarm information output controller 5c in the processing unit 5, as a means for providing alarm information described later. Then, alarm information for the surrounding circumstances of the direction corresponding to the touched part, which means, if the upper part of the lever W is touched, the right backside, and if the lower part of the lever W, the left backside, is output to the driver H by the alarm information providing device 3a, 3b. Therefore, the driver H can, in the pre-stage of operating the lever W for operating the direction indicator for such as a lane change and at the time of putting a finger on the lever W, obtain alarm information for the direction to which he is going to operate. Accordingly, the driver can take precautions in the earlier stage.

In other words, the present embodiment is so configured that the touch sensing means 41,42 is formed in the outer periphery of the lever W for operating the direction indicator provided in the vehicle. In addition, the means for providing alarm information predicts that the lever W for operating direction indicator is to be moved to the direction opposite to the part touched by the driver and sensed by the touch sensing means 41,42. The means for providing alarm information assumes that the indicating direction of the lever shows the surrounding position of the vehicle, which requests alarm information corresponding to the part touched by the driver. Consequently, the means for providing alarm information provides alarm information for the position. Therefore, the driver H can, at the time of putting his finger on the lever W for operating the direction indicator, recognize the backside circumstances of the direction where he is going to flash the direction indicating lamp. Accordingly, the driver H obtains the alarm information faster than conventionally provided alarm information, which enables the driver to reconfirm the surroundings. That is to say, the driver H can request alarm information in the same sense as watching mirrors to confirm the backside circumstances during driving, obtain the alarm information, and confirm easily the surrounding circumstances. Further, it can reduce influence of flashing the direction indicator on other vehicles, by not operating the direction indicator or deciding not to change the lane.

A touch by the driver to the touch sensing means 41,42 may be actually sensed at the processing unit 5. That is, the processing unit 5 may include a touch sensing unit (not shown) for sensing a touch by the driver according to a signal from the touch sensing means 41,42, and the means for receiving an alarm information request 4 may include the touch sensing means 41,42 formed in the lever W for operating the direction indicator, and the touch sensing unit formed in the processing unit 5.

However, the touch sensing means 41,42, which is a part of the means for receiving an alarm information request 4 of the present invention, is not limited to the structure shown in FIG. 5. It may be so configured that a part, to which the driver touches, is sensed by one sensing means, and alarm information related to the surrounding circumstances of the vehicle corresponding to the touched part is provided to the driver H by the means for providing alarm information. This means, the touch sensing means 41,42 is not separately formed in the upper part and the lower part of the lever W for operating the direction indicator, but the whole lever may constitute the sensor, the upper part of which corresponds to the part shown as numeral 41 in the FIG. 5, and the lower part of which corresponds to the part shown as numeral 42 in the FIG. 5, to thereby sense the touched part by identifying it. Further, the touch sensing means is not limited to be provided in the outer periphery of the lever W for operating the direction indicator.

Further, the touch sensing means having a function of sensing the touched part by the driver H is not limited to be formed in the lever W for operating the direction indicator. It may be formed on the handle, on the rear side of the handle, on the instrument panel, and the like. The form is a padded type, and by touching a predetermined part of it, the driver can request alarm information by defining the direction, for example, the right side behind the vehicle. Note here that the relation between a touched part and a surrounding position for requesting alarm information is set beforehand, and upon confirmation of the relation, the driver H requests. In this way, by forming the touch sensing means within a range where the driver can easily touch, the driver can easily operate it to thereby request alarm information for the desired position. Moreover, by providing an oscillating function as an alarm information providing device 3 described later to the padded-type touch sensing means, alarm information is provided to the finger of the driver requesting the alarm information, so that the driver recognizes the alarm information more easily.

Further, the means for receiving an alarm information request 4 is not limited to be formed of the touch sensing means. It may be formed of a push button operative by a pressing force. That is, only when the button is pressed, alarm information for the surrounding information may be provided to the driver H.

(Means for Providing Alarm Information)

Next, a means for providing alarm information will be explained. The means for providing alarm information is formed of an alarm information providing device 3 such as a lamp 3a or a buzzer 3b, and an alarm information output controller 5c in the processing unit 5 for controlling the operation of the devices. Upon receipt of information that a request form the driver H is detected at the means for receiving an alarm information request 4, the means for providing alarm information operates to provide alarm information for the vehicle to the driver H.

The alarm information providing device 3 for actually providing alarm information to the driver or passengers, which is also the means for providing alarm information, may be a means which is visually recognizable 3a such as LED provided in the inner panel as same as a conventional example, a means recognizable by audio 3b such as a buzzer, or an oscillation generating means formed of a material touchable to the driver, which material oscillates to provide alarm information to the driver. The oscillation generating means 3c is a vibrator with a typical motor used for various devices. Although the oscillation generating means may be incorporated in the vibrator, the sheet of the driver H, the handle, or the like, it is incorporated in the lever W for operating the direction indicator in the present embodiment as shown in FIG. 6 (*a*). By incorporating the oscillation generating means in the lever W for operating the direction indicator as described above, the alarm information providing device can be provided at the part where the driver touches when operating the direction indicator, so that the alarm information is certainly provided to the driver with oscillation from the device.

In this way, since the alarm information is informed only to the driver H through feeling, it does not bother passengers as a buzzer or the like. Moreover, it is not required to look at an indication by an alarm lamp or the like, to thereby suppress transfer of the eye point of the driver, so that the driver can concentrate on driving.

In the present embodiment, in a case that the touch sensing means 41, 42, which is also the aforementioned means for receiving an alarm information request 4, is provided in the lever W for operating the direction indicator, it means that the means for receiving an alarm information request 4, and the alarm information providing device 3 which is a part of the means for providing alarm information, are provided to the lever W, as shown in FIG. 6(*b*). With this configuration, the driver H is supposed to request alarm information when putting his hand on the lever W for operating the direction indicator, and when alarm information exists, the lever W for operating the direction indicator oscillates. The oscillation is transmitted to the hand put on the lever W, so that the driver can recognize the alarm information through a set of operations.

Here, whether the means for providing alarm information provides alarm information or not is decided at the object contact possibility determining unit 5b of the processing unit (controller), which is a part of the aforementioned means for recognizing surrounding circumstances. Here, the decision is made according to, not only driving conditions of the vehicle driving the right or the left side behind, which is recognized by the back camera 2, but also the relative distance and the relative speed between the own vehicle and the object vehicle calculated by detecting the speed and the like of the own vehicle, the driving direction of the driver H recognized at the means for receiving an alarm information 4, and the like. The object contact possibility determining unit 5b decides, according to these values, the alarm level based on the criteria defined beforehand. An example of the calculation method of the alarm level will be explained with reference to FIG. 7.

First, to set a condition for alarm information being provided, it is required that the driver H, as aforementioned, puts his finger on the lever W for operation the direction indicator so as to touch any one of the upper or the lower touch sensing means 41, 42, to thereby indicate an intention to flash any one of the right or the left direction indicating lamp, or indicate an intention to request alarm information. That is, the intention is sensed at the means for receiving an alarm information request 4. If the means for recognizing surrounding circumstances detects that another vehicle is driving behind in any one direction of the right or the left detected at the touch sensing means 41,42, the detected vehicle is considered to be the object for alarming.

Next, at the object contact possibility determining unit 5b of the processing unit 5, the relative speed and the relative distance between the own vehicle and the vehicle driving behind are calculated, and the resulting relation is determined to which region shown in FIG. 7(b) it belongs. According to the region, the alarm level is changed. As shown in FIGS. 7(a) and 7(b), as the relative speed between the own vehicle and the backside vehicle getting larger, the region is changed, so that the alarm level is also getting higher. This means the backside vehicle is approaching with high speed, having a possibility of an abnormal approach. Further, the "alarm level 4" shows a case that the relative speed is as same as that of the "alarm level 3", but the driver has actually operated the lever W for operating the direction indicator so as to indicate the direction. In this case, there is a possibility that the driver operates to change the driving direction such as a course change, right after. Therefore, the alarm level shows the highest.

According to the aforementioned alarm level, a method for providing alarm information to the driver H also changed. In the present embodiment, the means for providing alarm information, which is the oscillation generating means 3c, oscillates with an oscillation frequency or an oscillation pattern prescribed beforehand according to the surrounding information from the means for recognizing the surrounding circumstances, to thereby provide the alarm information to the driver H. Specifically, based on a rhythm of a case that the direction indicating lamp (turn signal) is flashed, several oscillation patterns are formed by combining changes in the ratio of dividing to duty, as shown in FIG. 7(c). Further, by changing the frequency of the oscillation having a specific oscillation pattern, the providing patterns of the alarm information increase, so that the oscillation pattern corresponding to each alarm level is formed, as shown in FIG. 7(a).

Each data related to the criteria for alarm levels shown in FIG. 7(a), the relation between relative speed and relative distance shown in FIG. 7(b), and the oscillation patterns shown in FIG. 7(c) is determined by the system designer beforehand, and is stored in a storing device provided in, for example, the processing unit 5. The data is read out and referred to when necessary, during predetermined processes such as an object contact possibility determination processing.

The aforementioned method for providing alarm information is an example. Setting of alarm levels, oscillation patterns, and oscillation frequency is not limited to the aforementioned. Further, the providing method of alarm information is not limited to oscillation.

Further, the present invention is not limited to the structure that the means for providing alarm information operates and alarm information is provided to the driver H only when the alarm information is requested from the driver H to the means for receiving an alarm information request 4. As shown in the conventional example, the present invention may be operated to provide alarm information corresponding to the surrounding circumstances without any request from the driver H, which means, the invention may use the conventional technique together.

The object detecting unit 5a, the object contact possibility determining unit 5b, the alarm information output controller 5c, and other functions in the processing unit 5 can be realized by incorporating a program for each unit into CPU, or the processing unit 5. The each program may be stored in the memory in the processing unit 5 or other storing media in advance, and is incorporated when read out by CPU.

(Operation)

Next, the operation of the present embodiment will be explained with reference to FIGS. 8 to 10. FIG. 8 is a flowchart showing the general operation. FIG. 9 is a flowchart showing a part of the operation in detail. FIG. 10 is an explanatory diagram for explaining the effects of the present embodiment comparing with the operation of the conventional example.

First, image behind the vehicle is taken in by the back camera 2 (Step B1). The image is processed at the processing unit 5 and the vehicle driving behind the own vehicle is detected (Step B2). Next, the possibility of the own vehicle being contacted by the detected vehicle is judged by referring to the relative speed of these vehicles and the expected driving direction of the own vehicle (Step B3). If judged that the contact is possible, an alarm level indicating the required precautions is calculated (Step B4). Then, according to the calculated level, alarm information is output to the driver H through, for example, oscillation (step B5). It should be noted that the alarm information is output upon request from the driver H. Therefore, the operations from the Step B3 to the Step B5 are, specifically, performed by the operation shown in FIG. 9. In other words, although the detection of the back side vehicle is always performed at a predetermined cycle, the object contact possibility determination process, the alarm level calculation process, and the output process of the alarm information are performed only when the driver requests.

First, whether the driver H touched the lever W for operating the direction indicator, which is the means for receiving an alarm information request 4, is sensed (Step C1). This is performed by the touch sensing means 41, 42 provided to the lever W. If a touch is not sensed (negative determination in Step C1), the means waits until a touch is sensed, and when a touch is sensed, it determines that the driver H requests alarm information (positive determination in Step C1).

Here, it is determined that which one of the touch sensing means 41,42, provided on the upper part and the lower part of the lever W, is touched (Step C2). When the upper part is touched (determined the upper part is touched in Step C2), it is predictable that the driver H pulls down the lever W to flash the direction indicating lamp on the right direction, and that the vehicle is going to change the course to the right direction, therefore, proceeding to Step C3. In contrast, when the lower part is touched (determined the lower part is touched in Step C2), it is predictable that the driver H pushes up the lever W to flash the direction indicating lamp on the left direction, and that the vehicle is going to change the course to the left direction, therefore, proceeding to Step C4.

Subsequently, it is determined that whether there is a possibility that the vehicle driving backside, which is in the position corresponding to the predicted driving direction of the driver H, contacts the own vehicle or not, and the alarm level is calculated (Steps C3 and C4). Then, oscillation according to the calculated level is generated in the lever W for operating the direction indicator (Step C5), which has been already touched by the driver H. The driver H can recognize the oscillation, so that the driver can take immediate action before flashing the direction indicating lamp to the backside vehicle, while taking precautions against the backside vehicle.

It should be noted that the processes of Steps B3 and B4 shown in FIG. 8 may always be performed, and alarm information may be provided, that is, the oscillation may be output, using the touch by the driver H to the lever W for operating the direction indicator as a trigger. Therefore, the processes of Steps C3 and C4 may be performed at any time without request for alarm information from the driver H, that is, without a touch to the lever W for operating the direction indicator.

With this configuration, as shown in FIG. 10, alarm information is provided to the driver H through oscillation or the like (numeral PB2) at a touching stage (PB1), which is the pre-stage of operating the blinker lever. This is different from the conventional example, in which alarm information is provided (PA2) after operating the lever W for operating the direction indicator (blinker lever) (numeral PA1). There may be a case that, when the lever W is operated after receiving the alarm information (PB3), another alarm information is provided through larger oscillation (PB5). In the conventional example, the driver H can take an avoidance measure against the alarm information only within an "effective corresponding period (PA4)". In the present invention, however, as shown in FIG. 10, the driver H has a precaution period called the "pre-corresponding period (PB4)", so that the driver can cope with the alarm information (PB6) with enough time (effective corresponding period (PB7)). Therefore, an abnormal approach which may be caused between the own vehicle and the other can be avoided beforehand (PB8). Especially, useless flash of the direction indicating lamp can be avoided since the driver can cope with the alarm information before flashing the direction indicating lamp, and also unnecessary influence on the backside vehicle by reacting to the unnecessary flashes can be avoided.

The present invention is configured and functions as described above. Since the present invention has the means for receiving an alarm information request for sensing request for alarm information from the driver, and is so configured that the means for providing alarm information operates when a request from the driver is sensed at the means for receiving an alarm information request to thereby provide alarm information to the driver, the driver can obtain alarm information when necessary and when he requests. Especially, since the alarm information is provided through oscillation, it can suppress discomfort caused by alarm information always appearing in the vehicle. Further, the means for receiving an alarm information request is not linked with an operation for changing the motion of the vehicle. Therefore, the driver can obtain the alarm information corresponding to the backside circumstances before changing the motion of the vehicle (for example, flashing the blinker), so that the influence on the backside vehicle is small. These are the excellent effects of the present invention, which have not been seen in the conventional examples.

Especially, in the present invention, the means for providing alarm information and the means for receiving an alarm information request are provided to the lever for operating the direction indicator (blinker lever), and the touch sensing means is used for sensing a request for alarm information from the driver when the driver touches the means for receiving an alarm information request. Therefore, the driver can obtain alarm information for the position behind the vehicle by touching the lever for operating the direction indicator, which is easily operable. This can reduce the burden of the driver.

Further, the present invention predicts the intention of the driver to operate the lever for operating the direction indicator in accordance with the position touched by the driver, and provides alarm information for the backside of the corresponding direction. Therefore, the driver can obtain, at the stage of putting his finger on the lever for operating the direction indicator but before operating the lever, alarm information for a direction to which the lever is going to be operated. In this way, the present invention can provide alarm information corresponding to a set of driving operations of the driver.

What is claimed is:

1. An alarm information providing apparatus for a vehicle comprising:
    a recognizer that recognizes surrounding circumstances of the vehicle in a plurality of directions;
    a provider that provides alarm information to a driver only upon sensing a request from the driver according to surrounding information output from the recognizer that recognizes surrounding circumstances; and
    a receiver that receives an alarm information request so as to control the provider using an instruction from the driver as a trigger and comprises a sensor provided to an indicator manipulable to indicate a directional change, the sensor configured to transmit information specifying a direction to an alarm information output controller by touching the sensor, the output controller does not operate with an operation for emitting a turn signal;
    wherein the receiver specifies a direction of the surrounding information to be output according to the instruction from the driver and outputs information of a specified direction as the trigger to the provider, and
    the provider switches indicated alarm information according to the instruction from the driver based on the information of the direction output from the receiver.

2. The alarm information providing apparatus for a vehicle as claimed in claim 1, wherein the indicator indicates a lane change and informs the lane change to a following vehicle driving behind, wherein the provider operates with enough time for an effective corresponding period by a time that the indicator operates.

3. The alarm information providing apparatus for a vehicle as claimed in claim 2, wherein the effective corresponding period is set prior to an operation of the indicator.

4. The alarm information providing apparatus for a vehicle as claimed in claim 2, wherein the indicator comprises a lever that operates a direction indicator, and the receiver is provided to the lever that operates the direction indicator.

5. The alarm information providing apparatus for a vehicle as claimed in claim 4, wherein the receiver is provided independently from the lever that operates the direction indicator.

6. The alarm information providing apparatus for a vehicle as claimed in claim 1, wherein the receiver comprises a touch sensing device which operates by a touch of the driver, and the touch sensing device specifies the direction of the surrounding information according to a touch position where the driver touches.

7. The alarm information providing apparatus for a vehicle as claimed in claim 1, wherein the receiver comprises a switching structure which operates by a pressure applied by the driver, and specifies the direction of the surrounding information by identifying a direction of the pressure applied by the driver.

8. The alarm information providing apparatus for a vehicle as claimed in claim 1, wherein the provider provides the alarm information to the driver through an oscillation via a component material of the receiver.

* * * * *